Nov. 1, 1955 H. M. OLSON 2,722,467
PISTON RING EXPANDER SPRING
Filed Dec. 22, 1952

Inventor
Holly M. Olson
By Frank E. Liverance Jr.
Attorney

United States Patent Office 2,722,467
Patented Nov. 1, 1955

2,722,467
PISTON RING EXPANDER SPRING

Holly M. Olson, Muskegon, Mich., assignor to Sealed Power Corporation, Muskegon, Mich., a corporation of Michigan Application December 22, 1952, Serial No. 327,348

3 Claims. (Cl. 309—40)

The present invention relates to piston ring spring expanders, and is particularly concerned with an inner located expander for piston rings, of novel structure, readily and economically produced, and which is independent of necessity of pressing against the bottom of a piston ring groove in which installed, the expander being adapted to be used in so-called bottomless ring grooves as well as in those which have continuous bottoms.

It is a primary object and purpose of my invention to produce a piston ring expander of the type noted, which is made rapidly and, in quantity one after another, from a continuous length of ribbon stock of thin tempered spring steel, said expander springs each having a novel construction of circumferential body portion, and at the parting gap in the expander a novel, operatively interlocking means at the adjacent ends of the expander spring, which is of circular form and parted at one side. Such interlocking means insures that the expander shall be circumferentially compressed with an assurance that no disconnection at the parting will occur when the expander is installed behind a piston ring in the ring receiving groove of a piston, and such piston, piston ring and expander put in an engine cylinder.

An understanding of the invention, and of a practical, effective embodiment thereof, may be had from the following description, taken in connection with the accompanying drawing, in which.

Like reference characters refer to like parts in the different figures of the drawing.

Figure 1:
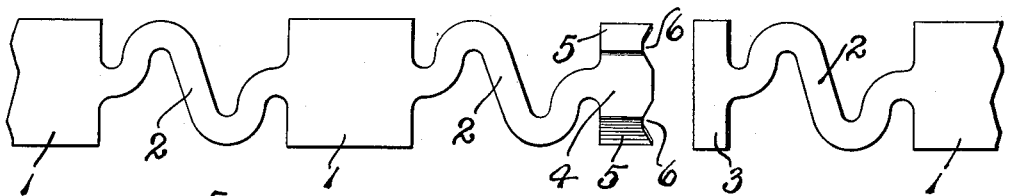
Fig. 1 is a fragmentary, enlarged elevation of the preferred form of construction embodying my invention, the parting in the expander shown being open.

From thin steel ribbon stock, having a width slightly less than the axial width of a piston ring groove in which the expander is to be used, a length of such stock is die processed to provide a succession of rectangular sections 1, connected by integral yielding ties 2. The ties 2, of the form shown in Fig. 1, are of a generally S-shape, horizontally disposed; and by pressure against opposite ends thereof transmitted from the sections 1, such ties resistantly yield, whereby in the circular form in which the expander is made, there is a circumferential shortening of such expander.

The expander is of an initial preselected length and in circular form, having a parting gap at a side where the ends of the expander come together when the expander is thus circumferentially compressed and contracted. One end has a rectangular section 3 connected to the next adjacent tie 2, which may be narrower than the sections 1 but of the same dimension as the width of the ribbon stock used.

Figure 2:
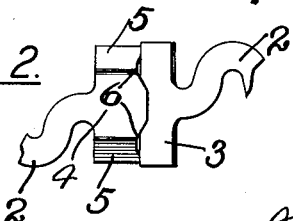
Fig. 2 is a similar view of the expander at said parting closed as in use.
Figure 3:
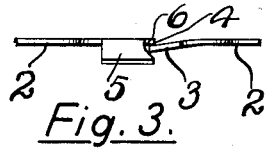
Fig. 3 is a plan view of the closed parting shown in Fig. 2.
Figure 4:
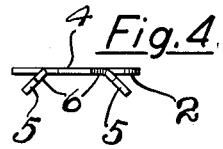
Fig. 4 is an end view of one end of the expander at said parting.

At the other end is a second end section 4, the end portions of which, beyond the adjacent end of the associated tie 2, are bent inwardly into wings 5, at an acute angle to the plane of such section 4. Notches 6 are made at the free edge portions of section 4 and wings 5, into which the adjacent edge portions of section 3 are received (see Figs. 2 and 3) when the expander is closed at its parting gap and is ready for compression, or is compressed when installed for use.

Figure 5:
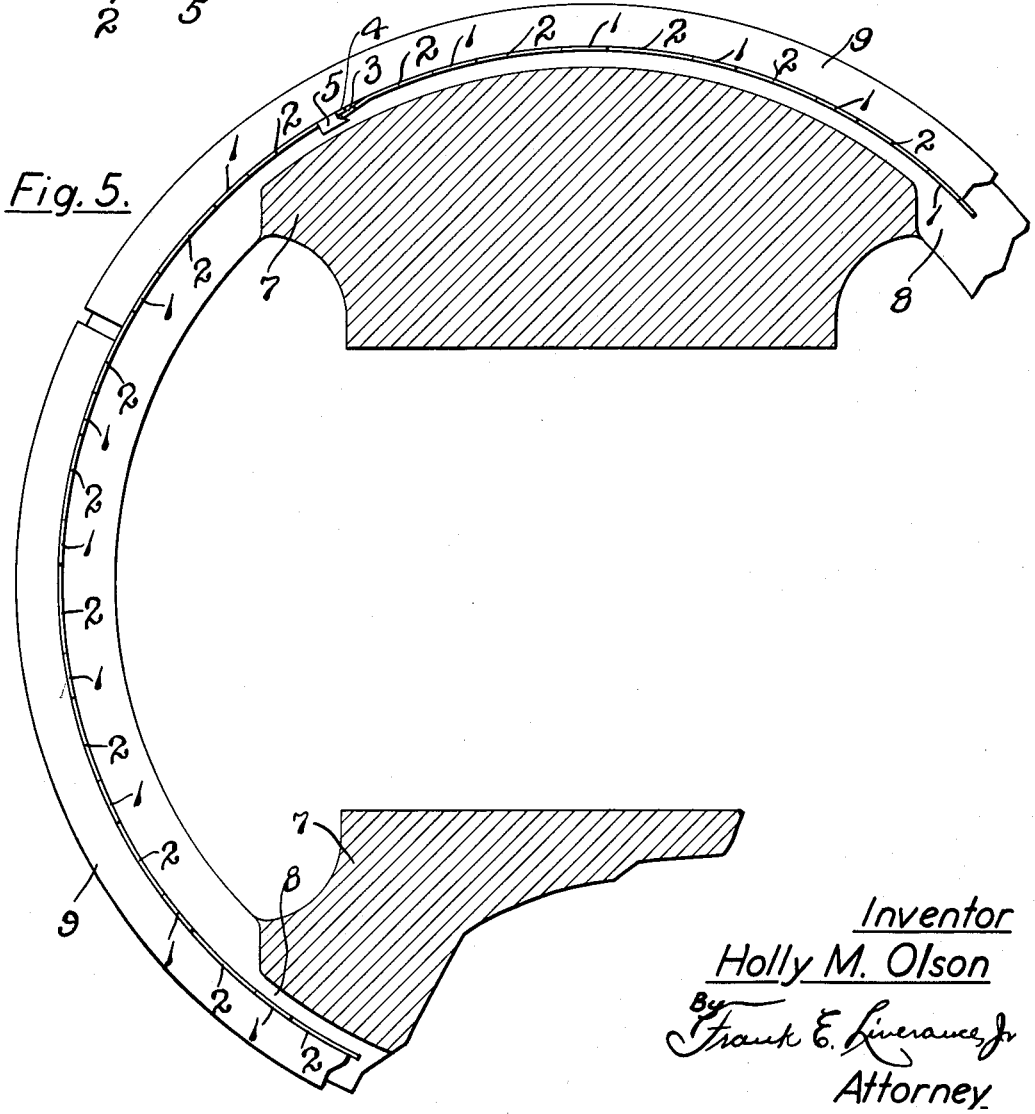
Fig. 5 is a fragmentary plan view of the expander as installed back of a piston ring in a ring receiving groove of a piston, said piston being in horizontal section.

The expanders of my invention are used with pistons and piston rings. In Fig. 5, a piston 7 has a continuous annular groove 8 around it in which a parted piston ring 9 of usual conventional, or other structure, may be placed. The expander of my invention is within the groove 8 back of the piston ring 9. The section 3 of the expander is engaged in the notches 6.

When the piston ring 9 is contracted and closed at its parting upon insertion of the piston and rings thereon in an engine cylinder, the expander is circumferentially shortened in length, ties 2 yielding but with resistance, thus engendering forces which tend to return the expander to its initial larger circumference, resulting in an outward pressure against the piston ring 9 and causing an added pressure of the piston ring against a cylinder wall within which the piston ring is located.

It is apparent from the foregoing, that the expander does not rely upon bearing against the bottom of a piston ring groove, and that it is equally adapted to be used in bottomed ring grooves and those of the so-called bottomless type, shown in Fig. 5. The sections 1 of the same width as of the piston ring 9, and slightly less in width than the axial dimension of the ring groove 8, keep the expander in a fixed relation to the sides of the ring groove, insuring against any side or lateral movement of such expander. The section 3 is offset inwardly a short distance, substantially equal to the thickness of the ribbon stock used (see Fig. 3), but the remaining portions of the expander are in the same circular radius, whereby such expander engages against the inner side of the piston ring 9 substantially throughout the length of such surface.

Manufacture of the expanders in continuous quantity operations is readily accomplished. The novel expander of my invention has proved to be of exceptional merit.

The invention is defined in the appended claims and is to be considered comprehensive of all forms of structure coming within their scope.

I claim:

1. An expander adapted to be installed in a piston ring groove of a piston back of a piston ring in said groove comprising, a parted generally circular length of thin sheet metal having, in the length thereof, a plurality of spaced generally rectangular short sections each having a width substantially equal to the axial width of a piston ring back of which said expander is adapted to be located, and having ties substantially in the same planes with said sections between successive sections, yieldably contractible in the direction of the circumference of said expander to decrease distance between adjacent ends of successive sections, and interengaging means at the ends of said expander, where parted, adapted to hold said ends of the expander from separation or passing by each other on circumferential contraction of said expander.

2. A piston ring expander comprising, a generally circular length of thin, spring ferrous material having a parting at one side, the ends of said length of material at the parting being adapted to abuttingly engage, said length of material having successive spaced rectangular sections connected by generally S-shaped ties integral, at the ends of said ties, with said sections, said ties being located in substantially the same planes as the sections which they connect, and interengaging means on the end portions of said expander at the parting therein holding the ends of the expander from separation or passing by each other on circumferential contraction of said expander.

3. A parted piston ring expander comprising, a generally circular length of thin spring steel having, in the length thereof, a plurality of spaced short flat sections of a width substantially equal to the width of a piston ring back of which it is adapted to be located, and having yieldingly resistant ties between successive sections, one end of said expander, where parted, terminating in one of said flat sections and the other end in a similar section with the side edge portions thereof disposed at an acute angle to the central portion of said last mentioned section, the end edge of said last mentioned section having spaced notches therein adapted to receive the end edge portions of the section at the other end of said expander.

References Cited in the file of this patent
UNITED STATES PATENTS

| | | |
|---|---|---|
| 2,293,450 | Wilkening | Aug. 18, 1942 |
| 2,460,430 | Phillips | Feb. 1, 1949 |
| 2,564,744 | Wilkening | Aug. 21, 1951 |
| 2,635,933 | Engelhardt | Apr. 21, 1953 |
| 2,639,205 | Wilkening | May 19, 1953 |